United States Patent [19]
Von Holdt

[11] Patent Number: 4,856,977
[45] Date of Patent: Aug. 15, 1989

[54] TWO STAGE MOLD CENTERING SYSTEM

[76] Inventor: John W. Von Holdt, 6864 Lexington La., Niles, Ill. 60648

[21] Appl. No.: 214,389

[22] Filed: Jul. 1, 1988

[51] Int. Cl.$^4$ ............................................. B29C 45/36
[52] U.S. Cl. .................................. 425/468; 249/105; 249/144; 249/175; 425/192 R; 425/577
[58] Field of Search ............... 425/468, 577, 412, 414, 425/542, 150, 168, 182, 183, 190, 192 R, 195, DIG. 10; 249/122, 160, 175, 107, 135, 144, 63, 64, 105

[56] References Cited

U.S. PATENT DOCUMENTS

| | | | |
|---|---|---|---|
| 3,509,603 | 5/1970 | Halsall et al. | 425/577 |
| 3,767,156 | 10/1973 | Sullivan et al. | 425/468 X |
| 3,932,085 | 1/1976 | Horbach | 425/195 X |
| 4,125,246 | 11/1978 | Von Holdt | 249/64 X |
| 4,520,991 | 6/1985 | Letica | 249/135 X |
| 4,533,312 | 8/1985 | Von Holdt | 249/160 X |
| 4,552,328 | 11/1985 | Dutt et al. | 425/577 X |
| 4,632,357 | 12/1986 | Von Holdt | 249/144 X |
| 4,702,456 | 10/1987 | Von Holdt | 425/412 X |
| 4,733,801 | 3/1988 | Scammell | 425/577 X |
| 4,775,130 | 10/1988 | Von Holdt | 249/175 X |

*Primary Examiner*—Richard L. Chiesa
*Attorney, Agent, or Firm*—Allegretti & Witcoff, Ltd.

[57] ABSTRACT

A mold comprising a mold core and mold cavity defines means which permits and controls a slight outward stretching of the mold cavity from a first positively centered position to a second positively centered position. By this means, precision centering of the mold and core can be achieved even under ultra high molding pressures without significant core shift.

27 Claims, 3 Drawing Sheets

FIG. 1
FIG. 4
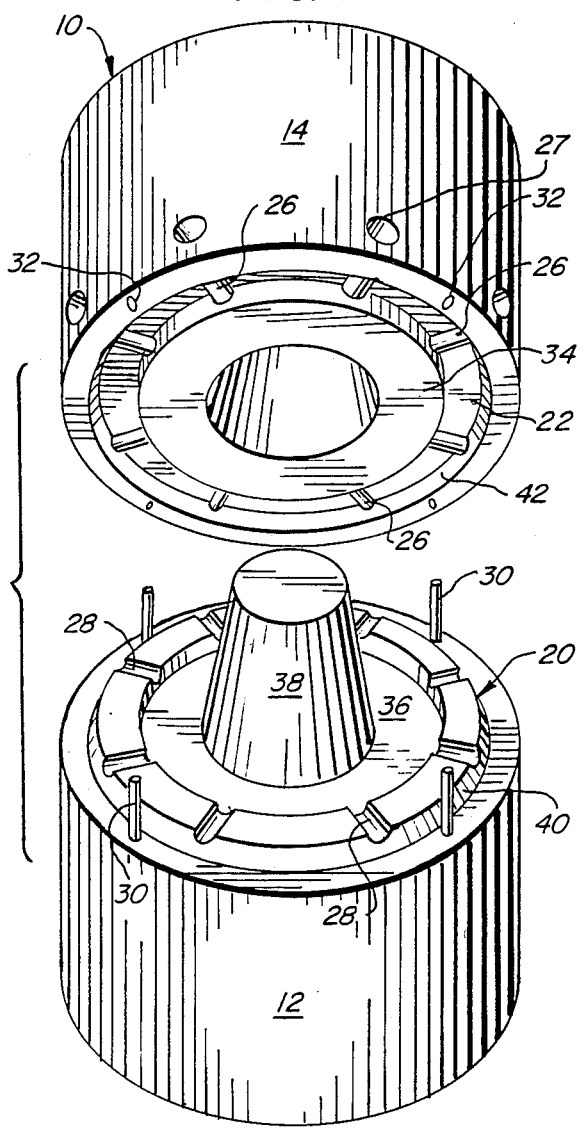
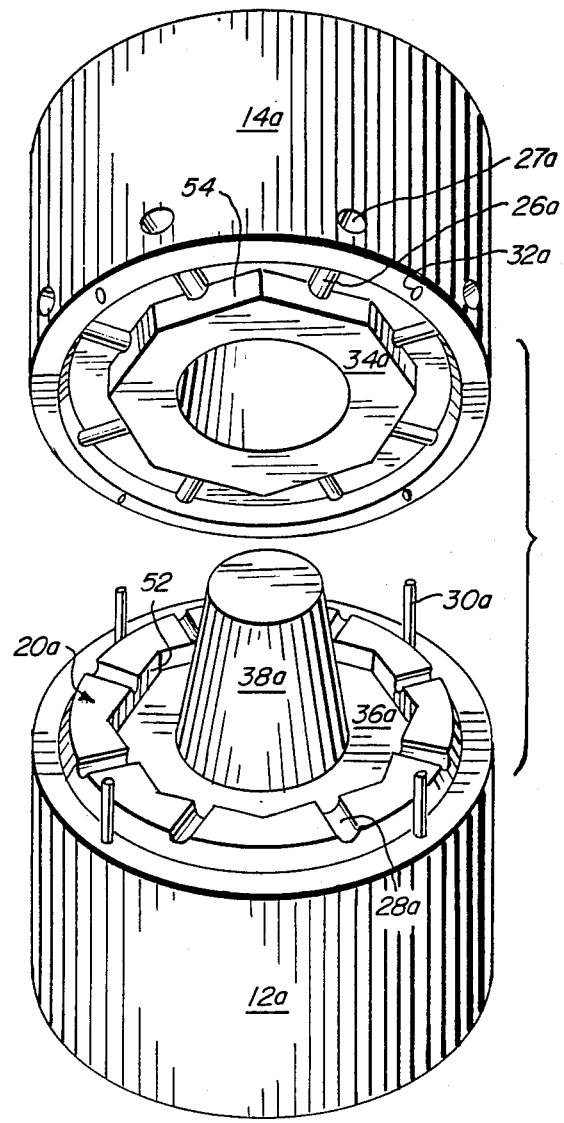
FIG. 2
FIG. 3
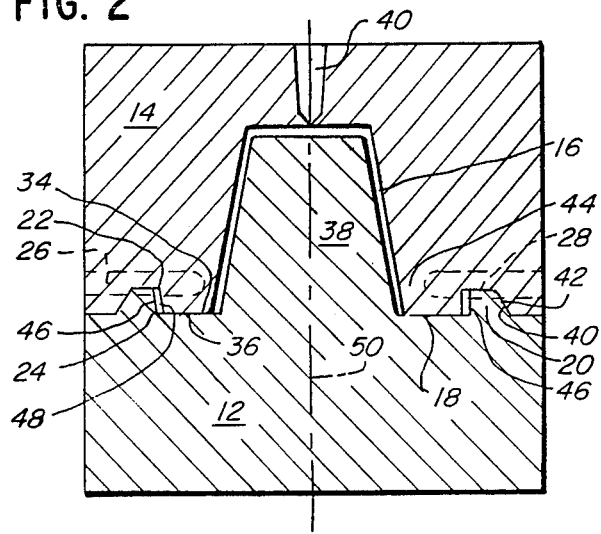
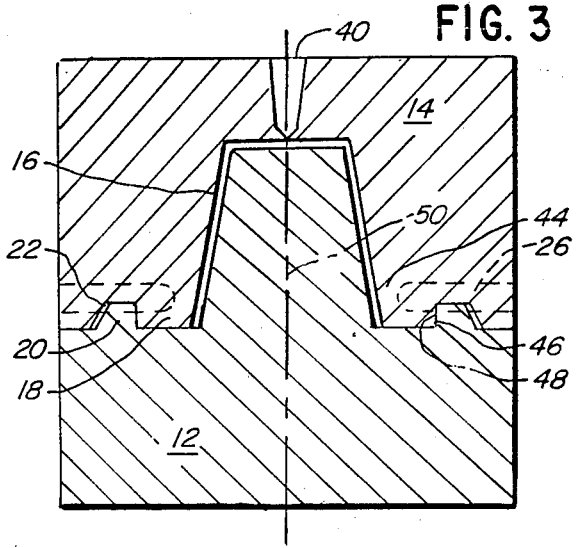

TWO STAGE MOLD CENTERING SYSTEM

BACKGROUND OF THE INVENTION

Recently, in the field of injection molding, high pressure injection molding units have become commercially available in which the molding pressures may be as high as 30,000 p.s.i., which is a significant increase from the molding pressures that have been previously used. The purpose of the higher molding pressures is to permit the molding of stronger, stiffer plastic materials in thinner wall thicknesses, for example in the manufacture of containers, in order to keep the unit price of the molded product as low as possible in the face of rising plastic raw material prices.

It has been found that with this increase in injection pressures, certain technical problems of operation have increased. Particularly under high molding pressures, it is possible for the injection mold core to laterally shift with respect to its mating injection mold cavity by a number of thousandths of an inch during the molding process. Particularly the situation where thin-walled containers are being manufactured, such core shift can significantly reduce the quality and uniformity of the molded products. The core shift can interfere with the production of thin-walled containers and other articles requiring a uniform wall thickness.

In accordance with this invention, a system is provided for assuring the proper positioning of a mold core in its mold cavity, even at high injection pressures, to permit the molding of thin-walled structures down to a wall thickness of 0.02 inch or the like, with a mold concentricity tolerance being maintained at a value on the order of 0.0002 inch. At the same time, the centering system of this invention can operate with significantly reduced wear, for long and reliable commercial manufacturing of plastic containers and other articles.

While hardened leader pins and hardened bushings for receiving the leader pins may be used in this invention, it has been found that this conventional expedient alone is not capable of holding good cavity to core concentricity under the high molding pressures that are now being used in the industry. Likewise, the conventional conical taper lock rings for providing engagement between the core and cavity can provide concentricity at pressures of 20,000 p.s.i. or less, but are less capable of providing good concentricity to the mold core and cavity at higher molding pressures. Additionally, the tapered surfaces of conventional taper locks between a mold core and cavity can cause a certain portion of the mold cavity expansion force created by high molding pressure to be resolved into a force vector that urges the core and cavity apart. Thus, any retraction motion that results can permit undesirable flashing to form on the molded object. By this invention, that problem is also reduced.

DESCRIPTION OF THE INVENTION

By this invention, a mold is provided which comprises a mold core and a mold cavity, movable between open and closed positions and together defining a mold chamber in the closed position. Sprue means are provided for supplying plastic molding compound to the molding chamber in the closed position. The mold core and the mold cavity define a parting line between them in the closed position, with one of the mold core and mold cavity defining centering projection means at the parting line defining radially inner and outer surfaces. This projection means projects into recess means defined by the other of the mold core and mold cavity in the closed position, for the purpose of centering the mold core and cavity.

In accordance with this invention, radially disposed projections are carried by one of the core and cavity. Radially disposed recesses are carried by the other of the core and cavity in a position to receive the radially disposed projections in the closed position of the mold to further facilitate mold centering. Also, one of the radially inward and outward surfaces of the projection means engages a mating, tapered face of the recess means upon moving into the closed position for further mold centering action. The other of the radially inner and outer surfaces of the projection means is spaced by typically no more than about 0.01 inch from a mating face of the recess means on entering the closed position. This space so positioned that pressurization of the molding chamber during molding can cause expansion of the mold cavity to cause engagement of the spaced surface of the projection means and its mating face of the recess for mold centering during the pressurization.

Accordingly, as a distinctive of the invention of this application, the centering projection means, which is preferably carried by the mold core, enters into the recess means carried by the mold cavity on mold closing, with the radially outward surface of the projection means engaging a radially outward surface of the recess means. Both of these surfaces are preferably tapered radially inwardly beginning from the base of the projection and moving outwardly. Then, when the molding chamber is pressurized, the mold cavity can actually expand outwardly by stretching, typically to enlarge its radius about 0.002 to 0.005 inch and generally no more than 0.01 inch, at which point the formerly spaced face of the centering projection means (preferably the radially inner face) enters into engagement with the corresponding face of the recess means. At that point, expansion of the mold cavity substantially ceases, with the newly engaging faces of the projection means and recess means providing significantly improved centering action for the mold core and cavity at unprecedentedly high molding pressures.

Typically, the faces of the projection means and recess means which engage during pressurization, are generally parallel with the axis of the mold rather than being tapered. Thus no resolved force vector is created which urges mold separation when the mold cavity is radially expanded.

When the molding cycle is complete, and the molding chamber has been depressurized, the mold cavity shrinks once again back toward its original configuration. Thus, the faces of the projection means and recess means which engage during pressurization are released, and the mold is openable with little or no wear taking place against those faces or other parts of the molding system. It is to be understood that the expansion and shrinkage of the mold cavity is very small in degree, typically on the order of 3 mils or the like.

Typically, the centering projection means defines an annular rib which is preferably carried by the mold core. In this circumstance, the recess means, carried by the mold cavity, is generally also annular.

The radially disposed recesses may, in preferred embodiments, intersect the centering projection means. These radially disposed recesses, which receive the radially disposed projections in the closed position of the mold, serve to provide adequate centering adjustment of the mold and cavity with respect to each other and to insure that the small amount of expansion and contraction of the mold cavity during operation takes place in a circumferentially uniform manner. It can be seen that the mold cavity can expand outwardly and contract inwardly for a few thousandths of an inch along the radially disposed projections in sliding manner, because of the radial disposition of the projections. Thus the small expansion and contraction of the mold cavity during the operation is not hindered by the presence of the radially disposed projections locked in the radially disposed recesses, but the latter projections and recesses inhibit off-center, unequal expansion of various circumferential portions of the mold cavity.

Alternatively, the centering projection means may comprise a plurality of projections of the substantial shape of a truncated triangle having a base. The base of each truncated triangular projection may be directed radially inwardly of the mold. Such a centering projection means projects into appropriately proportioned recess means, which are also of triangular shape. In this circumstance, the radially disposed projections and recesses, present for providing added mold centering action, may be positioned circumferentially between the truncated, triangular projections. Also in this circumstance, it is preferred the bases of the truncated, triangular projections to be curved to the substantial shape of the circumference of a circle having its origin at the axis of the mold, with the triangular recesses being of similar shape.

As another embodiment, the centering projection means may define a rib surrounding the axis of the mold in which the inner surface of the rib is of substantially polygonal shape, for example rectangular shape. In this circumstance, the outer surface of the centering rib may also be of polygonal shape, for example, rectangular, or alternatively, it may be of annular shape.

It is also preferred for leader pin and bushing means to be provided to the mold core and cavity of this invention, for further alignment of the core and cavity. The bushings are positioned to receive the leader pins to facilitate such alignment. Additionally, to facilitate the slight expansion and contraction of the mold cavity in accordance with this invention, the bushings may be radially elongated to permit radial movement of the leader pin as the mold cavity expands and contracts. The degree of elongation is sufficient to permit one of the radially inner and outer surfaces of the projection means to engage the recess means when the mold depressurized, and the other of the radially inner and outer surfaces of the projection means to engage the opposed surface of the recess means when the mold chamber is pressurized at high pressures, for example, 30,000 p.s.i.

By this means, a nonwearing injection mold system is provided which exhibits very close centering tolerances even under intensely high molding pressures, so that thin-walled containers and the like may be effectively molded.

DESCRIPTION OF DRAWINGS

FIG. 1 is a perspective view of a separated mold core and mold cavity for manufacturing containers in accordance with this invention.

FIG. 2 is a longitudinal, sectional view of the mold core and cavity of FIG. 1 in their molding position, prior to pressurization of the molding chamber.

FIG. 3 is a sectional view similar to FIG. 2, showing the proposed molding system in its configuration during application of ultra-high pressurization within the molding chamber.

FIG. 4 is a perspective view of a separated mold core and cavity, showing another embodiment in accordance with this invention.

DESCRIPTION OF SPECIFIC EMBODIMENTS

Figure 5:
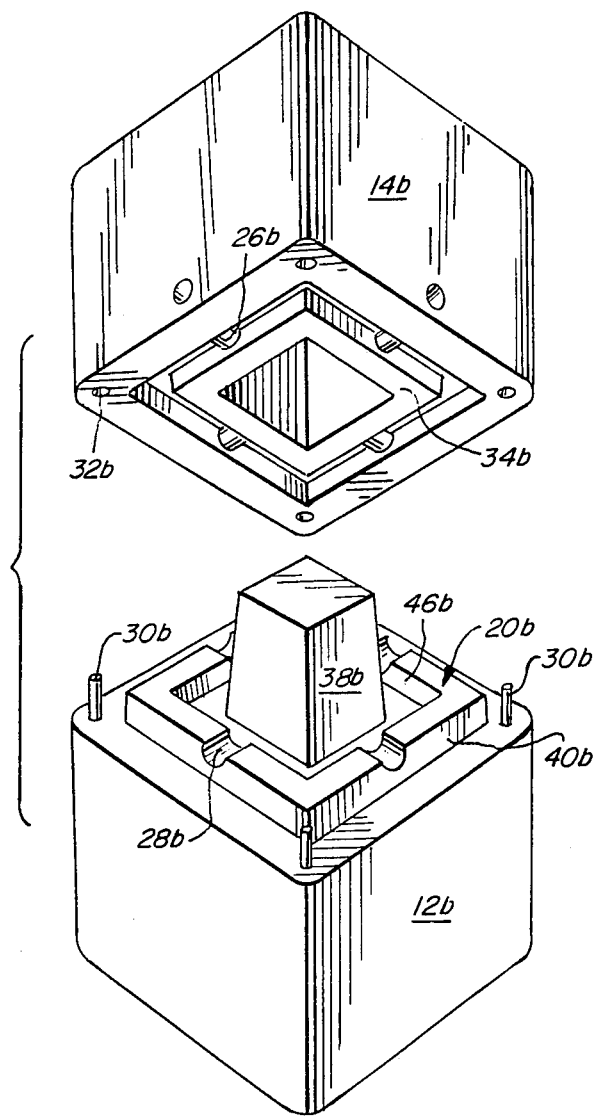
FIGS. 5 through 7 are each perspective views of different embodiments of separated, mating mold cores and cavities in accordance with this invention.

Referring to FIGS. 1 through 3, an injection mold system is shown for the manufacture of thin-walled containers. The mold system as shown of course does not include all parts which are conventionally found in molding apparatus, since the molds of this invention may be used in conventional molding machinery, and may be manufactured in accordance with conventional design, except as otherwise specifically disclosed herein.

Injection mold 10 comprises a mold core 12 and mold cavity 14 which may be conventionally moved between open and closed positions, and together define a molding chamber 16 in the closed position, as shown in FIGS. 2 and 3. As is conventional, mold core 12 and cavity 14 also define a parting line 18 between them in the closed position.

Mold core 12 defines centering projection means 20, projecting upwardly from its inner face toward mold cavity 14. Mold cavity 14, in turn, define recess means 22, which is proportioned to receive centering projection means 20. Recess means 22 is slightly oversized by typically about 0.003 inch in the radial direction, so that a small radial gap 24 is provided between one wall 46 of projection 20 and inner wall 48 of recess 22, as shown in FIG. 2. This annular gap 24 is thus on the order of 0.003 inch wide.

Mold cavity 14 defines several radially disposed, cylindrical rods 26, positioned through apertures 27, which are matched by mating, radially disposed recesses 28, which extend across annular centering projection 20, as shown. Thus, when mold halves 12, 14 are brought into closed relation as in FIGS. 2 and 3,, centering projections 26 intersect annular projection 20 and reside in radial recesses 28. It can be seen that as mold halves 12, 14 close, and the radial projections 26 enter radial recesses 28, the mold halves 12, 14 are strongly urged toward a centered position, particularly when the projections 26 and recesses 28 are uniformly disposed in circular array about the axis of mold 10.

Additionally, leader pins 30 are positioned on mold core 12, (or alternatively mold cavity 14), to enter bushings 32 for providing further alignment and centering between core 12 and cavity 14 in the closed position.

Accordingly, when core 12 and cavity 14 are brought into the closed position for a molding shot, annular plate 34 portion of cavity 14 enters into sealing contact with annular plate portion 36 positioned about core member 38, to provide a seal to the bottom of molding chamber 16 as shown in FIG. 2. Molten molding compound then flows into molding chamber or cavity 16 through sprue 40, typically at ultrahigh pressures as may be necessary for the molding of high strength plastic materials into thin-walled containers having a wall thickness of 0.02 inch or the like. As molding chamber 16 fills, a heavy, outwardly directed pressure is directed against the portions of mold cavity 14 which are radially outward from molding chamber 16. It is at this point where it is found that prior art molding systems exhibit unplanned and undesirable core shifting due to such heavy pressures.

In accordance with this invention, a first stage of mold centering is provided as shown in FIG. 2, with centering action being provided by leader pins 30 and bushings 32, radial projections 26 and radial recesses 28, and also the centering action of annular ring 20 as positioned in recess 22. It can be seen that this first stage of mold centering, as shown in FIG. 2, includes the engagement of radially outward surface 40 of centering ring 20 with the radially outward surface 42 of recess 22. Centering rings per se are known in the art for molds, making use of an inwardly tapered surface similar to surface 40 to engage a surface in a groove similar to surface 42 for desired mold centering.

Then, when pressurized molding compound is forced into molding chamber 16 under circumstances of ultrahigh pressure, the steel portion 44 of cavity 14 that defines sealing plate member 34, may actually be forced to expand by a matter of a few thousandths of an inch. As this happens, the radially inward face 48 of annular recess 22 is actually forced outwardly by a corresponding few thousandths of an inch, to enter into engagement with radially inward face 46 of annular centering rib 20. At this point, further expansion, and non-uniform expansion, of steel portion 44 is inhibited or prevented, so that the degree and mode of the expansion becomes very predictable and uniformly repeatable.

Additionally, when the molding process is completed and it is desired to open the mold, the pressure in molding chamber 16 may be released. This, in turn, results in a small amount of radial shrinkage of the molded object in the molding chamber 16 and also steel portion 44 of cavity 14. Thus, face 48 shrinks inwardly to a small degree with respect to face 46 of annular centering rib 20, prior to opening of mold portions 12, 14. As a result, little or no wear takes place between faces 46, 48 during the molding operation.

It can also be seen that faces 48 and 46 are generally parallel to the axis 50 of the mold. Thus, when heavy radial pressures are generated by the heavy pressures in molding chamber 16, there is no component of force that tends to urge mold portions 12, 14 outwardly away from each other, as may be found in conventional mold designs because of the presence of pressure against its angled surfaces of centering rings.

Thus, the mold of FIGS. 1—3 can operate under ultrahigh pressures, using strong but high viscosity plastic molding compounds to mold thin-walled objects, while providing high precision centering of the respective mold parts 12, 14 with respect to each other, for producing accurate dimensions in the products molded therein. Additionally, despite the presence of such high pressures, the mold of this invention operates in its cycle with very little wear for long term manufacturing operation, as a consequence of the two-stage centering technique as illustrated specifically by FIGS. 2 and 3.

Turning now to FIG. 4, another design of mold in accordance with this invention is provided. Mold core 12a and mold cavity 14a are of generally similar construction to the mold of FIG. 1, operating and being constructed in identical manner except as otherwise described herein.

Core 12a defines a core member 38a which fits in conventional manner into cavity-defining plate member 34a as in the previous embodiment. The surface defined by member 34a provides an annular sealing against recessed face 36a of core 12a.

In accordance with this invention, the centering projection means 20a defined by core 12a, exhibits an inner, polygonal surface 52 which is proportioned to closely fit with outer polygonal surface 54 of cavity defining member 34a of the mold cavity 14a. This of course represents a departure from the design of FIG. 1 where both the analagous surfaces 46, 48 are annular. As before, surfaces 52, 54 may each be parallel to the mold axis, i.e. each of the sections of the surfaces can define a plane which can include a line parallel to the axis.

As in the previous embodiment, steel dowel pins 26a are inserted through lateral holes 27a to form the desired radially disposed projections that meet with radial recesses 28a to facilitate initial centering of the mold system. Additionally, leader pins 30a and bushings 32a are provided as before. Bushings 32a exhibit a small amount of radial elongation as in the previous embodiment to permit planned expansion and contraction of cavity 14a.

Turning to FIG. 5, a third embodiment is shown, capable of molding containers of rectangular cross-section. As before, mold core 12b and mold core cavity 14b may be of a design similar to the previous embodiments except as otherwise described herein. As can be seen, both core 12b and cavity 14b may be of rectangular cross-section. Core member 38b is also of rectangular cross-section, and slightly tapered as shown, to meet with portion 34b of cavity 14b to define a molding chamber of rectangular cross-section in the closed position.

In this embodiment, centering projection 20b may be rectangular, or specifically square, as shown. However, as in the previous embodiments, radially outer surface 40b may be tapered in a manner analagous to radially outer surface 40 of the previous embodiments, while radially inner surface 46b may be parallel to the mold axis as in the previous embodiments. Thus, a transverse sectional view through the mold of FIG. 5 in the closed position, during its operation, would be very similar to the sectional views of FIGS. 2 and 3, with the functioning of the mold being similar and analagous thereto.

Radially disposed projections 26b of mold cavity 14b engage the radial recesses 28b for initial mold centering, as in the previous embodiment, with added mold centering action being provided by leader pins 30b, which engage bushings for hole 32b for added transverse mold alignment. Once again, it is preferable for bushings 32b to be slightly elongated in the radial direction (toward the mold axis) to accommodate a slight amount of expansion of core 14b.

Figure 6:
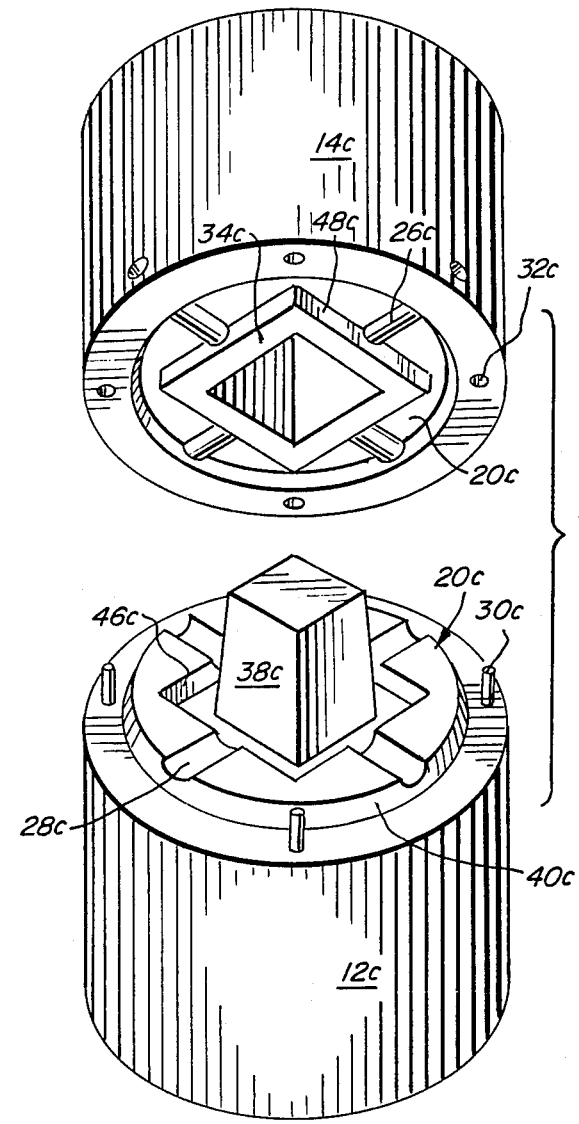

Referring to FIG. 6, a mold similar to FIG. 5 is provided except that the centering projection means 20c of mold core 12c defines a circular radially outer surface 40c but a square or rectangular radially inner surface 46c, to fit into corresponding recess means 22c. Under pressure in the mold chamber, surface 48c expands outwardly into contact with normally spaced inner surface 46c of projection means 20c, in a manner analogous to that previously described. Thus mold core 12c and cavity 14c may be of circular outer cross-section, while the mold chamber defined by core member 38c and cavity portion 34c, may be of rectangular cross-section.

As in previous embodiments, radially disposed projections 26c fit into radially disposed recesses 28c for preliminary mold centering, and leader pins 30c fit into bushings 32c of cavity 14c. As before, bushings 32c may be radially elongated to a slight degree to permit the planned expansion and contraction of particularly cavity portion 34c with respect to centering projection 20c.

Figure 7:
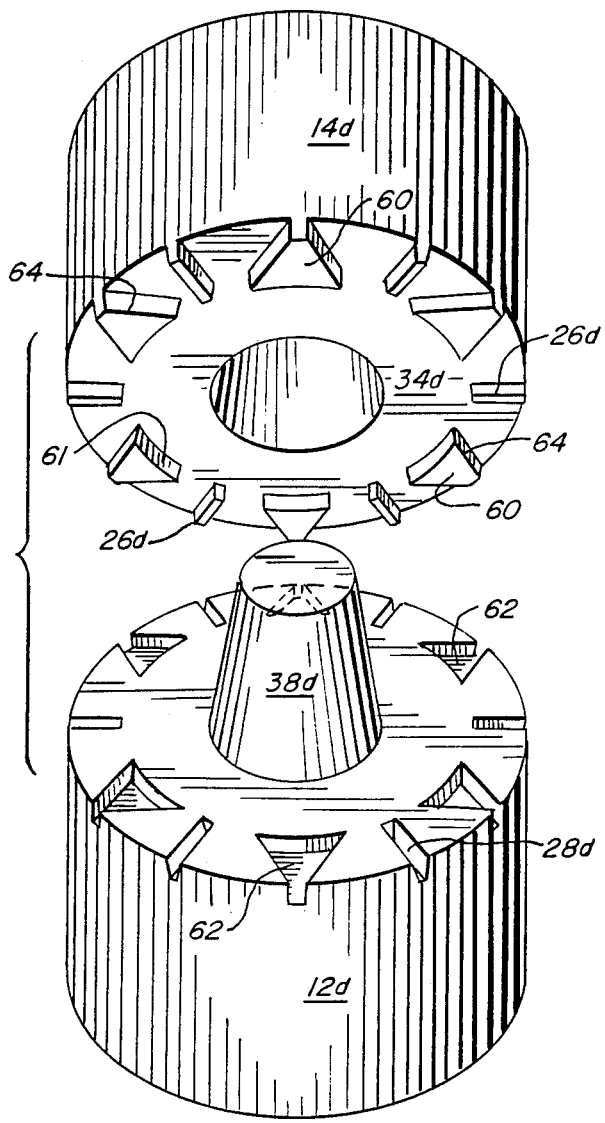
Figure 8:
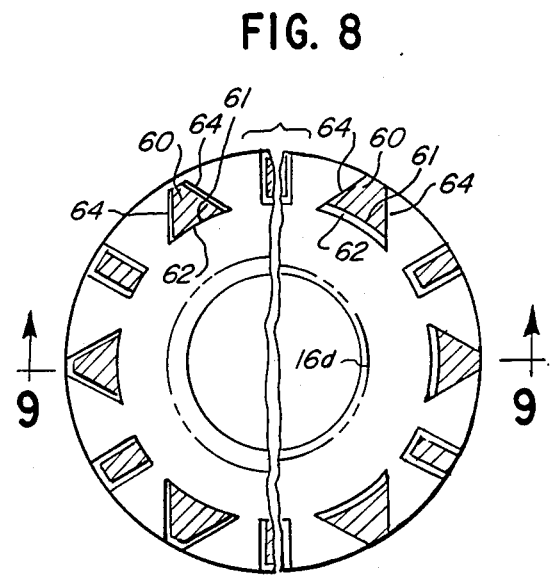
FIG. 8 is a transverse sectional view of the closed mold core and cavity of FIG. 7, with one-half thereof shown with the molding chamber not pressurized, and the other half shown with the molding chamber under ultra-high pressurization.
Figure 9:
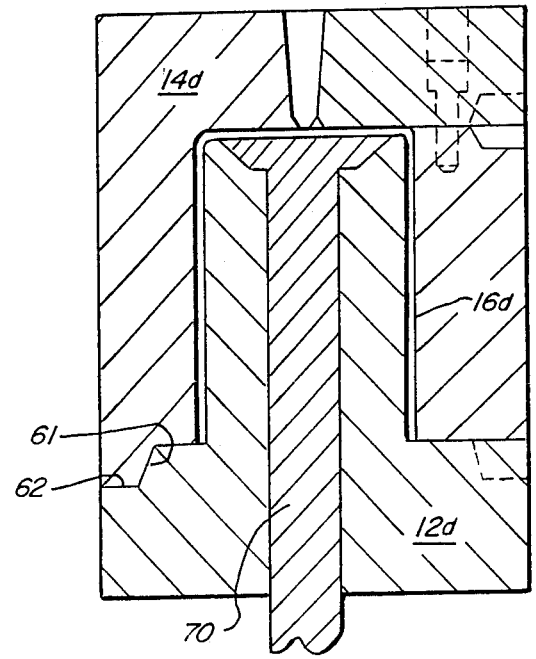
FIG. 9 is a sectional view taken along line 9—9 of FIG. 8.

Referring now to FIGS. 7–9, a mold having an alternate design of centering system in accordance with this invention, is disclosed. Mold core 12d and mold cavity 14d may be of conventional design except as otherwise described herein. Core member 38d projects into the aperture defined by cavity defining portion 34d. Radially disposed projections 26d are provided on the face of cavity defining portion 34d for initial centering of the respective mold core and cavity 12d, 14d.

In accordance with this particular embodiment of the invention, a plurality of generally triangular centering projections 60 are also defined on the face of the mold cavity defining portion 3d. Centering projections 60 are provided to engage generally triangular recesses 62. FIG. 8 shows a transverse section of the engaging mold portions 12d, 14d, with the left half of FIG. 8 showing interengagement of projections of 60 and recesses 62 in the nonpressurized condition of the molds, and the right half of FIG. 8 shows the interengagement between members 60, 62 when the molding chamber is pressurized with ultrahigh pressure to cause radial expansion of mold core 14d by a few mils.

As shown, in the nonpressurized situation, projections 60 engage recess 62 at the base wall 61 of triangular projection 60 and the corresponding base wall of recess 62. This wall may be appropriately tapered if desired to facilitate mold engagement as the mold closes.

Then, upon the application of ultrahigh pressure to the molding chamber defined between core member 38c and cavity portion 34d, cavity portion 34d is expanded radially outwardly by a few mils so that triangular base wall 61 of projections 60 becomes separated from the corresponding wall of recess 62, and the triangular side walls 64 of projections 60 engage the corresponding side walls of recess 62, as shown in the right hand side of FIG. 8. Thus, the expansion of cavity 14d is controlled and limited to a predetermined expanded configuration. Furthermore, the respective side walls 64 of both projections 60 and base 62 may be straight with respect to the mold axis and not tapered. Accordingly, upon depressurization of the molding chamber 16d, and the corresponding slight radial shrinkage of mold cavity 14d, the respective triangular walls 64 of projections 60 and recesses 62 become separated again due to the slight inward shrinkage of cavity 14d, so that the mold halves 12d, 14d may be easily separated without wear in the molding cycle.

As shown in FIG. 9, push rod 70, of conventional design, may be provided to facilitate removal of items molded in molding chamber 16d.

The above has been offered for illustrative purposes only, and is not intended to limit the scope of the invention of this application, which is as defined in the claims below.

That which is claimed is:

1. In a mold which comprises a mold core and a mold cavity movable between open and closed positions and together defining a molding chamber in the closed position, and sprue means for supplying plastic molding compound to the molding chamber in the closed position, said mold core and mold cavity defining a parting line between them in the closed position, and one of said mold core and mold cavity defining centering projection means at said parting line defining radially inner and outer surfaces, which projection means project into a recess means defined by the other of said mold core and mold cavity in the closed position to center said mold core and cavity, the improvement comprising, in combination:

radially disposed projections carried by one of said core and cavity, and radially disposed recesses carried by the other of said core and cavity in a position to receive the radially disposed projections in the closed position to facilitate mold centering, one of said radially inner and outer surfaces of the projection means engaging a mating, tapered face of the recess means upon moving into the closed position for further mold centering action, the other of the radially inner and outer surfaces of the projection means being slightly spaced from a mating face of the recess means on entering the closed position, whereby pressurization of said molding chamber during molding can expand said mold cavity to cause engagement of the spaced surface of the projection means and its mating face of the recess for mold centering during pressurization.

2. The mold of claim 1 in which said centering projection means defines an annular rib carried by the mold core and the recess means is also annular.

3. The mold of claim 1 in which said radially disposed recesses intersect said centering projection means.

4. The mold of claim 1 in which said projection means comprise a plurality of projections of the substantial shape of a truncated triangle having a base, the base of each truncated triangular projection being directed radially inwardly of said mold.

5. The mold of claim 4 in which said radially disposed projections and recesses are positioned between said truncated triangular projections.

6. The mold of claim 5 in which the bases of said truncated triangular projections are curved to the substantial shape of a circumference of a circle having its origin at the axis of said mold.

7. The mold of claim 1 in which said centering projection means defines an annular rib, the outer surface of said annular rib being tapered inwardly.

8. The mold of claim 7 in which the inner surface of said annular rib defines a tubular section which is coaxial with the axis of said mold.

9. The mold of claim 1 in which said centering projection means defines a rib surrounding the axis of said mold in which the inner surface of said rib is of substantially rectangular shape.

10. The mold of claim 9 in which the outer surface of said centering rib is of substantially rectangular shape.

11. The mold of claim 9 in which the outer surface of said centering rib is of annular shape.

12. The mold of claim 9 in which the outer surface of said centering rib is tapered inwardly relative to the axis of said mold.

13. The mold of claim 12 in which the inner surface of said centering rib is of substantially tubular shape, said tubular shape having an axis that is coaxial with the axis of said mold.

14. The mold of claim 1 in which leader pin and bushing means are provided for further alignment of said mold core and cavity, said leader pin and bushing means defining leader pins carried on one of said mold core and cavity and bushings defined in the other of said mold core and cavity for receiving said leader pins, said bushings being radially elongated to permit relative radial movement between said leader pins and bushings during said expansion of the mold cavity.

15. In a mold which comprises a mold core and a mold cavity movable between open and closed positions and together defining a molding chamber in the closed position, and sprue means for supplying plastic molding compound to the molding chamber in the closed position, said mold core and mold cavity defining a parting line between them in the closed position, and one of said mold core and mold cavity defining centering projection means at said parting line defining radially inner and outer surfaces, which projection means project into a recess means defined by the other of said mold core and mold cavity in the closed position to center said mold core and cavity, the improvement comprising, in combination:

one of said radially inward and outward surfaces of the projection means engaging a mating, tapered face of the recess means upon moving into the closed position for further mold centering action, the other of the radially inner and outer surfaces of the projection means being spaced by a short distance from a mating face of the recess means on entering the closed position, whereby pressurization of said molding chamber during molding can expand said mold cavity to cause engagement of the spaced surface of the projection means and its mating face of the recess for mold centering during said pressurization.

16. The mold of claim 15 in which said centering projection means defines an annular rib, the outer surface of said annular rib being tapered inwardly.

17. The mold of claim 16 in which the inner surface of said annular rib defines a tubular section which is coaxial with the axis of the mold.

18. The mold of claim 15 in which leader pins and bushings are provided for further alignment of said mold core and cavity, said leader pins and bushings defining leader pins carried on one of said mold core and cavity and bushings defined in the other of said mold core and cavity for receiving said leader pins, said bushings being radially elongated to permit relative radial movement between said leader pins and bushings during said expansion of the mold cavity.

19. In a mold which comprises a mold core and a mold cavity movable between open and closed positions and together defining a molding chamber in the closed position, and sprue means for supplying plastic molding compound to the molding chamber in the closed position, the mold core and mold cavity defining a parting line between them in the closed position, said mold core defining centering projection means at the parting line defining radially inner and outer surfaces, which projection means projects into a recess means defined by the mold cavity in the closed position to center the mold core and cavity, the improvement comprising, in combination:

radially disposed projections carried by one of the core and cavity, and radially disposed recesses carried by the other of the core and cavity in a position to receive the radially disposed projections in the closed position to facilitate mold centering, the projection means defining a closed loop figure which in turn defines a central aperture, the radially outer surface of the projection means engaging a mating, tapered face of the recess means upon moving into the closed position for further mold centering action, the radially inner surface of the projection means being spaced by no more than about 0.01 inch from a mating face of the recess means on entering into the closed position, said radially inner surface being parallel to the axis of the mold, whereby pressurization of the molding chamber can expand the mold cavity causing engagement of the radially inner surface of the projection means and its mating face of the recess for mold centering during said pressurization.

20. The mold of claim 19 in which leader pin and bushing means are provided for further alignment of said mold core and cavity, said leader pin and bushing means defining leader pins carried on one of said mold core and cavity and bushings defined in the other of said mold core and cavity for receiving said leader pins, said bushings being radially elongated to permit relative radial movement between said leader pins and bushings during said expansion of the mold cavity.

21. The mold of claim 19 in which said centering projection means defines an annular rib carried by the mold core and the recess means is also annular.

22. The mold of claim 21 in which the inner surface of said annular rib defines a tubular section which is coaxial with the axis of said mold.

23. The mold of claim 19 in which said radially disposed recesses intersect said centering projection means.

24. The mold of claim 19 in which said centering projection means defines a rib surrounding the axis of said mold in which the inner surface of said rib is of substantially rectangular shape.

25. The mold of claim 24 in which the outer surface of said centering rib is of substantially rectangular shape.

26. The mold of claim 24 in which the outer surface of said centering rib is of annular shape.

27. The mold of claim 26 in which the inner surface of said centering rib is of substantially tubular shape, said tubular shape having an axis that is coaxial with the axis of said mold.

* * * * *